United States Patent [19]
MacDougall et al.

[11] Patent Number: 5,662,789
[45] Date of Patent: Sep. 2, 1997

[54] REMOVAL OF ORGANICS FROM AQUEOUS SOLUTIONS

[75] Inventors: Barry R. MacDougall, Ottawa; Michael A. Gattrell, Kanata; Olga Kargina-Power, Gloucester, all of Canada

[73] Assignee: National Research Council of Canada, Ottawa, Canada

[21] Appl. No.: 398,077

[22] Filed: Mar. 3, 1995

[51] Int. Cl.$^6$ .................................................. C02F 1/461
[52] U.S. Cl. ........................ 205/688; 205/742; 205/758; 205/759; 205/760
[58] Field of Search .................................. 205/688, 742, 205/758, 759, 760

[56] References Cited

U.S. PATENT DOCUMENTS

| | | | |
|---|---|---|---|
| 3,730,864 | 5/1973 | Tarjanyi et al. | 205/688 |
| 4,400,250 | 8/1983 | Fairhurst | 204/180 R |
| 4,443,309 | 4/1984 | Van Duin et al. | 205/702 |
| 5,332,509 | 7/1994 | Murphy | 205/745 |

FOREIGN PATENT DOCUMENTS 1162751  6/1985  U.S.S.R. .

OTHER PUBLICATIONS

M.M. Baizer, "Electrolytic Reductive Coupling", and H.J. Schafer, Electrolytic Oxidative Coupling, in H. Lund and M.M. Baizer (Eds.), Organic Electrochemistry, Marcel Dekker, Inc., New York, 879–1028, (1991).
F. Beck, Electrochim. Acta, 33, 839, (1988).
C. Oloman, AIChE Symp. Ser., 77(204), 264–72, (1981).
M. Gattrell and D.W. Kirk, Can. J. Chem. Eng., 68, 997–1003, (1990).
D. Schmal, J. van Erkel and P.J. van Duin, Inst. Chem. Eng. Symp. Ser. No. 98, pp. 281–290, (1986).
P. Fedkiw and C. Dwiggins, "Electrosorption of Phenol onto Activated Carbon", presented at 1981 Annual Meeting, AIChE, New Orleans, Nov. 1981.
J. McGuire, C.F. Dwiggins, and P. Fedkiw, J. Appl. Electrochem. 15, 53–62, (1985).
R.S. Eisinger and G.E. Keller, Environ. Prog., 9 (4), 235–44, (1990).

*Primary Examiner*—Arun S. Phasge
*Attorney, Agent, or Firm*—J. Wayne Anderson

[57] ABSTRACT

A process is described for electrochemically "collecting" certain organic compounds from aqueous solutions in an immobilized and concentrated manner conducive to subsequent destruction. The method is applicable for organic compounds amenable to electrochemical coupling, e.g. by condensation. The method involves the electrochemical reaction of the organic compounds to form substantially water insoluble coupling products in the form of deposits or films on the working electrode surface. This method has the advantage of greatly concentrating and immobilizing the organic compounds on the surface of the working electrode. The immobilization of the organics allows the material to be transferred to a different environment or allows the environment to be changed to facilitate destruction of the organics. This advantage, along with the high "local" concentration of the organic material on the electrode's surface, allows various methods of post treatment or destruction to be carried out, which would not be possible or would not be as efficient if carried out directly on the initial dilute waste water.

20 Claims, No Drawings

REMOVAL OF ORGANICS FROM AQUEOUS SOLUTIONS

BACKGROUND OF THE INVENTION

1. Field of the Invention

This invention relates to the removal of organic contaminants from aqueous solutions, and in particular to a process for the removal of organic compounds which are amenable to electrochemical coupling in an electrochemical cell.

There is presently great interest in methods for economically removing and disposing of organic toxins from waste water. For the purposes of this application, the term "Waste water" is used to refer not only to effluent flows from chemical processes, but also to contaminated surface and ground water. Some of the methods presently used involve adsorption onto active carbon followed by landfill, incineration or regeneration, and direct chemical treatment (e.g. hydrogen peroxide addition activated with ultraviolet light). There are also some proposed electrochemical treatment systems which involve direct oxidation or reduction of waste water to achieve destruction or detoxification of the toxic organics.

Active carbon is commonly used for adsorbing impurities from waste streams and from inlet streams in water treatment. The removal of impurities involves physical adsorption of the materials onto the surface of the active carbon. After the surface of such carbon will no longer adsorb organic (i.e. the carbon surface is at equilibrium with the waste at some, typically, sub-monolayer coverage) the carbon must be removed from service. At such time the carbon can be disposed of in landfill, by incineration, or some method of regeneration must be used. Regeneration commonly involves heating the carbon to high temperature to volatilize the adsorbed species and the resulting off gases are incinerated and/or scrubbed. Such thermal regeneration results in the loss of around 10 wt. % of the carbon material, implying that after c.a. 10 regenerations all of the original carbon has been consumed. Also, the active carbon must be removed from the adsorption unit and transported to a suitable thermal regeneration facility (where suitability refers to the degree of off gas scrubbing/treatment and is dependent on the nature of the adsorbed material). Thus, any method of increasing the amount of material which can be loaded on the carbon and thereby extending the time between regenerations would be useful.

2. Description of the Prior Art

Methods of direct treatment of waste water include chemical treatment (using oxidants such as bleach, peroxide or metal ions) and electrochemical treatment (anodically to mineralize organics either directly or using reactive intermediates, and cathodically to reduce the toxicity by dehalogenating, for example chlorinated organics). These direct treatment methods are limited by the low concentration the organic toxins usually found in waste water leading to low reaction rates and poor efficiencies (chemical efficiency for chemical oxidants or current efficiency for electrochemical treatments). Direct treatments are also limited because of the need to add to the waste water stream chemicals such as: reactants, catalysts or highly conductive (i.e. high concentration) electrolytes, and often the need to later recover or neutralize them.

Biological treatments tend to be slow, requiring a large hold up volume, and therefore a large equipment size. Such treatments, especially when the waste water contains fairly toxic compounds, tend to be temperamental and for dilute streams require the continuous addition of nutrient mixtures.

Condensation reactions of many compounds are well known in organic electrochemistry (1). These reactions typically involve the generation of radical intermediates, through electrochemical oxidation or reduction, these then react leading to the formation of higher molecular weight, less soluble compounds. Most fundamental work on these reactions has been done in non-aqueous environments (1) though some aqueous work has been carried out involving the use of electrochemical polymerization (from relatively high concentration solutions) for coatings production (2). Such condensation products have also been noted in electro-organic synthesis (3) and direct electrochemical waste water treatment (4), where the resulting loss of electrode activity due to the build-up of condensation products on the electrode presents a problem with some processes.

This collection of toxic compounds from a waste stream by condensation is fundamentally different from the commonly known approach of electrosorption. Electrosorption involves applying a potential to an electrode in order to make the adsorption of a compound more favourable and can involve the partial or complete transfer of an electron from the target compound to form a surface bound spieces. The electrode used can also be a high specific surface area carbon electrode such as packed beds of granulated active carbon (6) or active carbon cloth (7). Electrosorption, however, tends to be chemically reversible allowing adsorption and desorption cycle to be used to concentrate a target compound (see (8) for example). Also, while electrosorption can produce a perturbation of an adsorption isotherm or the formation of a surface bound species, in both cases it is limited to monolayer coverage.

SUMMARY OF THE INVENTION

In the present invention, electrochemical coupling, e.g. by condensation, is provided by applying a sufficient potential to a working electrode to react the target compounds, leading to coupling and the formation of higher molecular weight products, which in aqueous solutions are often insoluble and precipitate on the working electrode. (Only certain classes of compounds, as will be discussed later, will react in this way; unlike electrosorption which is a more general phenomena). Condensation is often chemically irreversible or only slowly reversible, thus allowing the collected material to be retained while transferring the electrode to a better environment for destroying the compounds or changing the electrolyte, without having to maintain the electrode potential throughout the operation. Condensation can also produce multilayer deposits of considerable thickness allowing for much higher loadings before regeneration or treatment is required.

In the present invention, such electrochemically initiated condensation reactions are usefully employed as the first stage of a water treatment process. The condensation reaction is used to remove amenable classes of organic compounds from dilute waste water streams as an immobilized deposit allowing them to then be more effectively treated in a later stage. This has the advantage that, as well as removing the organic compounds from the waste stream, the method collects them in a concentrated form which makes further treatment methods more effective. Such a process provides a clear advantage over existing direct waste water treatment methods in that the often severe conditions required to destroy many organic toxins are effected as an after-treatment to the present process. This reduces the chemical and/or power requirements as compared to the requirements for directly treating large volumes of dilute waste water. The electrochemical collection also has the advantage over physical adsorption that higher loadings of collected compounds are possible. This would result in longer adsorption/collection cycles before requiring replacement or regeneration of the adsorbent/electrode (or the same cycle time could be used with a smaller unit).

Accordingly, the present invention involves the use of electrochemistry (using minimal electrolyte conductivity) to apply a potential to a working electrode in order to react certain classes of organic compounds to form electrochemical coupling products, for example condensation or polymerization products.

It is believed that during electrolysis the target compound is not degraded, e.g. in the case of pentachlorophenol PCP to $CO_2$, $H_2O$ and $Cl_2$, but rather appears to undergo a coupling reaction, e.g. a condensation reaction involving 1 electron transfer per molecule of target compound to form a substantially water-insoluble higher molecular weight coupling product on the surface of the working electrode. That is, in the case of a carbon working electrode, the pentachlorophenate ion donates 1 electron to the carbon. For some other target compounds, the electron transfer appears to be in the range of 1–2.

The compounds produced are collected as a deposit or film on the working electrode surface. This type of collection, as well as removing the organic compounds from the waste stream also provides the collected organic in an immobilized, concentrated form with far higher loadings than are possible by physical or electrochemical adsorption. This immobilization of the organics allows them to be further treated using the optimal environment for such treatment (i.e. high or low pH, high conductivity electrolyte, catalysts, organic electrolyte, etc.) which might not be possible or may be very difficult to achieve with direct treatment of the waste water. The collected organics are also available in a much more concentrated form, increasing the efficiency of such subsequent treatments.

According to one aspect of the invention, a process is provided for the removal of an organic compound amenable to electrochemical coupling from an aqueous solution in an electrochemical cell, said electrochemical cell including a working electrode, a counter electrode and an aqueous electrolyte, the process comprising applying a sufficient potential to said working electrode to deposit a substantially water-insoluble coupling product of said organic compound on the working electrode.

DETAILED DESCRIPTION OF THE INVENTION

According to the process described here, organic compounds which are amenable to electrochemical coupling leading to coupling e.g. condensation or polymerization products, can be collected at high current efficiency (usually 100%) to high loadings (i.e. on the order of 40 to 100 time that possible by physical adsorption).

The process works with most standard working electrode materials (including but not limited to: noble metals and carbon), but is most suitable for waste water treatment using high specific surface area electrodes, with those based on activated carbons being the most preferred. It will be appreciated that high specific surface area carbons can be provided for example, by using an open carbon structure such as a carbon felt, carbon cloth, reticulated carbon, bonded structures of carbon particles and fibers, or packed or fluidized beds of carbon particles, and/or by using an open carbon structure such as a carbon felt, carbon cloth, reticulated carbon, bonded structures of carbon particles and fibers, or packed or fluidized beds of carbon particles, and/or by increasing the roughness or porosity of the surface of a carbon material by, for example, etching the carbon surface with high temperature steam to produce a so called "activated carbon." With carbon electrodes it is preferred, though not necessary, to use carbon which, through pretreatment or by manufacture, has a hydrophillic surface. This type of surface slows the inhibition of the electrode as the deposit forms, allowing a higher maximum loading of organic materials.

Preferably, the electrode potential is selected so that it is of sufficient magnitude to initiate the reaction of the target compound or compounds, but below a potential where hydrogen or oxygen gas evolution occurs. For example, for a 280 ppm solution of PCP in a 0.25M, pH 6.4 buffer with a pyrolytic graphite working electrode if the potential is swept upward at 50 mV/s, the oxidation of PCP leading to coupling products is observed by an increase in current flow beginning around 0.11V (versus a $Hg/Hg_2SO_4/0.25M$ $Na_2SO_4$ reference electrode) and the current flow for oxygen evolution becomes a significant side reaction leading to a decrease in current efficiency at around 1.25V. Thus in this case a potential higher than 0.11V is necessary, with a potential between 0.11V and 1.25V being preferred. For a platinum working electrode under the same conditions, the condensation reaction begins around 0.2V and significant oxygen evolution starts around 0.8V, giving a necessary potential of greater than around 0.2V and a preferred range from 0.2V to 0.8V. (This larger useful voltage range for the carbon electrode is one of the reasons why carbon is the preferred electrode material). It will be appreciated that the applied potential will vary with the concentration and type of target compounds which are to be removed, the working electrode material and the electrolyte used (most importantly its pH), with these types of variations being familiar to those knowledgable in the field of electrochemistry. It will also be appreciated that either controlled voltage or galvanostatic conditions may be employed. For controlled voltage, the working electrode potential is controlled versus a reference electrode (potentiostatic), or the working electrode is controlled versus the counter electrode (controlled cell voltage).

Potentials in the preferred range can result in 100% current efficiency which, when combined with the very dilute solutions often encountered in waste water streams and the low number of electrons per target molecule, results in very low current densities being used. This permits the use of very low solution conductivities and therefore a very low concentration of electrolyte, making the operating costs of such a process lower than those for direct electrochemical processes for waste water treatment. Such direct electochemical processes, typically have lower current efficiencies (c.a. 1–10%) and a higher number of electrons per molecule for treatment (c.a. 10–30 equiv./mole) and therefore require much higher current densities and therefore proportionately higher concentration/conductivity electrolytes for an equal voltage drop in the electrolyte. Also, in the case of this invention, because the nature of the collection of the organics by deposition acts to inhibit the electrode as the deposit forms, the deposition process tends to be somewhat "self levelling" thus minimizing voltage variation problems sometimes encountered when porous electrodes are used with low conductivity solutions.

Therefore, this invention, in an industrial process, would have the advantage of using a much lower electrolyte concentration as compared to systems for direct electochemical waste water treatment, resulting in a considerable savings in the requirements for chemical addition and possible neutralization or recovery. It is also preferred, in order to minimize the possible neutralization costs, to use an electrolyte of close to neutral pH. For example, a buffer of close to neutral pH or a neutral salt such as NaCl.

The process works with compounds which can react to form insoluble compounds, through oxidative or reductive coupling reactions. Some example organic compounds amenable to this technique under anodic oxidation conditions consist of: aromatic compounds with hydroxyl amino, ether or alkene substituents, hetero-aromatic compounds such as pyrole, dioxins and furans, and also many thiol compounds. Some example organic compounds amenable to this technique under cathodic reduction conditions consist of many poly-halogenated compounds, and nitro-benzenes. Some specific example compounds of environmental interest which react in this manner are the whole range of chlorinated phenols (mono to penta chlorophenols), phenol, cresols (methyl phenols), xylenols (dimethyl phenols), as well as aniline, all which can be oxidatively coupled. For example, many sites previously used for the preservation of wood are contaminated with mixtures of PCP, cresol and tars. PCP and cresol, being more water soluble, can leach into the ground water thereby requiring some form of ground water treatment that can remove these compounds.

The post-treatment which follows the collection can consist of the various standard methods for treating and/or regeneration of active carbon including: landfilling, incineration and thermal regeneration. In all these examples the increased loading of the carbon possible through electrochemical coupling allows the lifetime of the carbon adsorbent before regeneration or disposal to be greatly increased. The electrochemical collection provides the greatest advantage when using other possible methods for treating the organic material and regenerating the electrode surface. These may not otherwise be as economical if used for direct treatment of the waste water or for treatment of active carbon which has been loaded by simple physical adsorption to typically sub-monolayer coverages. These methods can include, but are not limited to: electrochemical oxidation to break down the organics, electrochemical reduction to dehalogenate for example chlorinated organics to reduce their toxicity (perhaps as a precursor to oxidative treatment), electrochemical treatment by generation of reactive intermediates such as hydrogen peroxide (including peroxide radical) and metal ions, chemical treatments, non-aqueous electrochemical treatments, etc. In all these cases, this technology offers the advantage of immobilizing the organics, allowing them to be transferred to a different environment or allowing the environment to be changed to a more suitable environment for such treatment reactions. The method also yields the collected organics in a highly concentrated form and, especially useful for electrochemical treatment/electrode regeneration methods, provides this high concentration of organics immobilized on the electrode surface. These often hydrophobic deposits also act to inhibit the electrolysis of water improving the current efficiency of aqueous electrochemical treatment methods.

The method was tested using batch stationary and continuous flow-by electrochemical cell configurations. The successful collection of various compounds was determined by following their concentration with time using high performance liquid chromatography (HPLC). The fact that the disappearance of the target compounds was due to collection at the working electrode was supported by: the lack of apparent soluble products as measured by HPLC, the charge balance (typically 1 equivalent of electrons per mole; which is not sufficient for mineralization of the compounds), the visible appearance of a deposit on smooth electrodes after the collection reaction, and (in the case of PCP) carbon-14 measurements which confirmed the presence of the original carbon-14 labelled PCP collected on the electrode after anodic reaction.

In the examples which follow, the electrochemical cell includes a working electrode, a counter electrode, a reference electrode and an aqueous electrolyte. In some cases a separator is used to divide the cell into working and counter electrode compartments. The reference electrode used in these examples was a $Hg/Hg_2SO_4$ half cell with a 0.25M $Na_2SO_4$ electrolyte. Carbon felt electrodes referred to in the examples were from the Electrosynthesis Co, Lancaster, N.Y. (part #GF-S6) of various specified dimensions. All experiments were conducted at about room temperature i.e. about 25° C.

EXAMPLE 1

200 ml of 100 ppm (0.375 mM) pentachlorophenol (PCP) in a 1M, pH 6.4 acetate buffer was recirculated from a reservoir through a flow-by electrochemical cell containing a $6\times4\times0.6$ cm$^3$ carbon felt working (anode) electrode (with a specific area of roughly 1000 cm$^2$/cm$^3$). A same sized carbon felt counter electrode was used with a Nafion (trademark) membrane separating the working and counter electrode compartments. The solution reservoir was bubbled with nitrogen gas to remove dissolved oxygen. After 30 minutes the concentration had stabilized at 94 ppm (as measured by HPLC); the decrease being due to physical adsorption of some PCP on the carbon felt. The PCP solution was then treated potentiostatically with the working electrode polarized to 0.35V versus the $Hg/Hg_2SO_4$ reference electrode. After 30 minutes the PCP concentration had dropped below the sensitivity of the HPLC's ultraviolet detector (around 0.1 ppm). This indicates an enhancement oven physical adsorption of 94/6 or 15.7 times. The HPLC detected no soluble products as a result of the treatment and the current efficiency was 100% assuming 1 equivalent of electrons per mole of PCP removed.

EXAMPLE 2

100 mls of 100 ppm (0.375 mM) PCP in a 1 M, pH 6.4 acetate buffer was treated galvanostatically at 0.1 mA using a $1\times6\times0.6$ cm$^3$ carbon felt anode (c.a. 1000 cm$^2$/cm$^3$) in a divided batch cell. The counter electrode was platinum gauze and a glass frit was used as a cell separator. The cell working electrode compartment was bubbled with nitrogen gas to remove dissolved oxygen and to provide stirring. The potential showed an arrest around 0.15V versus the $Hg/HgSO_4$ reference electrode, during which time 77 ppm of PCP was removed at a current efficiency of 100% (i.e. without the potential rising into the oxygen evolution region). HPLC showed no soluble products were formed by the reaction.

EXAMPLE 3

As in Example 2 but using various other compounds gives enhancement over physical adsorption as noted (with the loadings given as mg of organic per gram of carbon felt electrode, the electrochemical loadings being galvanostatic at 0.1 mA without the potential rising into oxygen evolution, and the physical loadings in equilibrium with an organic concentration of c.a. 0.35 mM):

| Compound | Physical Loading (mg/g) | Electrochemical Loading (mg/g) | Enhancement |
|---|---|---|---|
| Pentachlorophenol | 0.26 | 23.4 | 91 |
| 2,4,6-Trichlorophenol | 0.14 | 9.12 | 66 |
| 2,4-Dichlorophenal | 0.07 | 5.61 | 84 |
| 4-Cresol | 0.03 | 6.20 | 208 |
| Phenol | 0.04 | 8.39 | 219 |

EXAMPLE 4

As in Example 2 but at 0.3 mA and the working electrode was pretreated by anodic polarization to produce a higher surface area and a more oxidized and hydophilic carbon surface. Without pretreatment the electrode loading was found to be 9.1 mg/g, while with pretreatment a loading of 21.9 mg/g was achieved.

PCP was collected from 100 ml of a 300 ppm solution in a 0.25M, pH 6.7 phosphate buffer at 0.45V versus the Hg/Hg$_2$SO$_4$ reference electrode. Platinum foil working and counter electrodes (c.a. 1 cm×6 cm) were used with no cell divider and no nitrogen bubbling. Over the time of collection 912 mC of charge was passed and the electrodes dry weight was found to increase by 2.5 mg (within error, a 100% mass balance). The material collected in this manner from a dilute aqueous solution was then transferred to acetonitrile with 0.1M tetraethylammonium perchlorate electrolyte, where voltammetry was carried out. The voltammetry used a glassy carbon electrode and indicated cathodic reduction peaks (typically characteristic of dechlorination reactions) at −2.07, −2.3 and −2.7V vs a Ag/AgNO$_3$ (0.1M) reference electrode. These peaks occurred independent of any side reaction such as solvent decomposition and so were at 100% current efficiency. In contrast direct electrochemical dechlorination in aqueous solution, through the use of cathodic potentials of similar magnitude, results in hydrogen evolution as the primary reaction and current efficiencies of c.a. 1% are typical (5).

References

1. M. M. Baizer, "Electrolytic Reductive Coupling", and H. J. Schafer, "Electrolytic Oxidative Coupling", in H. Lund and M. M. Baizer (Eds.), "Organic Electrochemistry", Marcel Dekker, Inc., New York, 879–1028, (1991).

2. F. Beck, Electrochim. Acta, 33, 839, (1988).

3. C. Oloman, AIChE Symp. Ser., 77(204), 264–72, (1981).

4. M. Gattrell and D. W. Kirk, Can. J. Chem. Eng., 68, 997–1003, (1990).

5. D. Schmal, J. van Erkel and P. J. van Duin, Inst. Chem. Eng. Symp. Ser. No. 98, p.281–90, (1986).

6. P. Fedkiw and C. Dwiggins, "Electrosorption of Phenol onto Activated Carbon", presented at 1981 Annual Meeting, AIChE, New Orleans, Nov. 1981. J. McGuire, C. F. Dwiggins, and P. Fedkiw, J. Appl. Electrochem. 15, 53–62, (1985).

7. D. Fairhurst, UK Patent GB 2,081,744A Feb. 24, (1982), U.S. Pat. No. 4,400,250 Aug. 23 (1983).

8. R. S. Eisinger and G. E. Keller, Environ. Prog., 9(4), 235–44, (1990).

What is claimed is:

1. A process for the electrochemical collection in an electrochemical cell of an organic compound amenable to electrochemical coupling in an aqueous solution, said electrochemical cell including a working electrode, a counter electrode and an electrolyte, the process comprising applying a sufficient potential to said working electrode to collect the organic compound as a deposit of a higher molecular weight substantially water-insoluble coupling product of said organic compound on the working electrode, but below a potential where a significant side reaction involving hydrogen or oxygen gas evolution occurs.

2. A process according to claim 1, wherein the reaction is initiated by anodic polarization resulting in the oxidative condensation of the organic compound.

3. A process according to claim 2, wherein the organic compound is selected from the group consisting of aromatic compounds with hydroxyl, amino, ether or alkene substituents, hetero-aromatic compounds and thiol compounds.

4. A process according to claim 1, wherein the reaction is initiated by cathodic conditions resulting in the reductive condensation of the organic compound.

5. A process according to claim 4, wherein the organic compound is selected from the group consisting of polyhalogenated compounds, and nitro-benzenes.

6. A process according to claim 1, wherein the working electrode is a high specific surface area carbon electrode.

7. A process according to claim 6, wherein the carbon electrode surface has been manufactured or treated in such a manner as to make it hydrophillic.

8. A process according to claim 7, wherein the carbon electrode is carbon felt.

9. A process according to claim 6, wherein the organic compound is pentachlorophenol, and wherein the coupling reaction involves a one-electron transfer per molecule of organic compound.

10. A process according to claim 1, wherein the potential of the working electrode is controlled against a reference electrode.

11. A process according to claim 10, wherein the process is continuous.

12. A process according to claim 1, wherein the reaction is galvanostatic.

13. A process according to claim 12, wherein the organic compound is selected from the group consisting of pentachlorophenol, 2,4,6-trichlorophenol, 2,4-dichlorophenol, 4-cresol and phenol.

14. A process according to claim 12, wherein the organic compound is pentachlorophenol having a concentration in the range of 300 ppm to <0.1 ppm, the electrolyte has a substantially neutral pH, the working electrode is a carbon felt, and the current is selected to polarize the working electrode in the range of about 0.11 to 1.25V versus an Hg/Hg$_2$SO$_4$/25M Na$_2$SO$_4$ reference electrode.

15. A process according to claim 1, wherein the aqueous electrolyte is a buffer of substantially neutral pH.

16. A process according to claim 1, wherein the organic compound is pentachlorophenol having a concentration in the range of 300 ppm to <0.1 ppm, the electrolyte has a substantially neutral pH and the working electrode is a carbon electrode polarized in the range of about 0.11 to 1.25V versus an $Hg/Hg_2SO_4/.25M\ Na_2SO_4$ reference electrode.

17. A process according to claim 1, including the additional step of removing the working electrode including the coupling product so formed from the electrochemical cell for destruction.

18. A process according to claim 1, wherein the working electrode is of platinum.

19. A process according to claim 1, wherein the coupling reaction involves the transfer of 1–2 electrons per molecule of the organic compound.

20. A process according to claim 1, wherein the potential of the working electrode is controlled against the counter electrode.

* * * * *